US011035749B2

(12) United States Patent
Sixsmith (10) Patent No.: US 11,035,749 B2
(45) Date of Patent: Jun. 15, 2021

(54) LEAK TEST SYSTEM AND METHOD FOR THERMOPLASTIC PIPING

(71) Applicant: Georg Fischer, LLC, Irvine, CA (US)

(72) Inventor: Thomas G. Sixsmith, Lake Forest, CA (US)

(73) Assignee: Georg Fischer, LLC, Irvine, CA (US)

( * ) Notice: Subject to any disclaimer, the term of this patent is extended or adjusted under 35 U.S.C. 154(b) by 163 days.

(21) Appl. No.: 16/270,449

(22) Filed: Feb. 7, 2019

(65) Prior Publication Data
US 2020/0256757 A1 Aug. 13, 2020

(51) Int. Cl.
*G01M 3/28* (2006.01)
*F16L 55/07* (2006.01)
*F16L 55/18* (2006.01)

(52) U.S. Cl.
CPC .......... *G01M 3/2815* (2013.01); *F16L 55/07* (2013.01); *F16L 55/18* (2013.01)

(58) Field of Classification Search
CPC ........ G01M 3/26; G01M 3/28; G01M 3/2807; G01M 3/2815; G01M 3/2846
USPC .................................................. 73/40–49.8
See application file for complete search history.

(56) References Cited

U.S. PATENT DOCUMENTS

| | | | | |
|---|---|---|---|---|
| 1,811,138 A | * | 6/1931 | Lassman ............. | G01M 3/2846 73/49.5 |
| 2,255,921 A | * | 9/1941 | Fear .................... | G01M 3/2853 73/46 |
| 2,408,202 A | * | 9/1946 | Dickman ............... | G01M 3/10 73/41.4 |
| 2,446,219 A | * | 8/1948 | Eaton ..................... | G01M 3/26 73/40.5 R |
| 2,504,530 A | * | 4/1950 | Jacobs .................. | G01M 3/202 73/40.7 |
| 3,500,676 A | * | 3/1970 | Palmer ................... | G01M 3/24 73/40.5 A |
| 3,673,858 A | * | 7/1972 | Miller .................. | G01M 3/2846 73/40.5 R |

(Continued)

FOREIGN PATENT DOCUMENTS

| CN | 101329012 B | 2/2015 |
|---|---|---|
| DE | 102007062781 | 4/2009 |

(Continued)

*Primary Examiner* — David A. Rogers
(74) *Attorney, Agent, or Firm* — Tsircou Law, P.C.

(57) ABSTRACT

A system and method for leak testing a thermoplastic piping system is disclosed. The leak test system includes a pump assembly having an air pump configured to pressurize a piping system with air, wherein the air pump is configured by design not to output pressure exceeding the piping system design limitations. The pump assembly further includes a pressure sensor, pressure controller, pressure switch, and solenoid valve for maintaining the pressure within the piping system to a prescribed pressure. The leak test system can include tubing for connecting the pump assembly to the piping system, and further include an ultrasonic leak detection device to locate potential leaks identified on the piping system. As such, the leak test system can safely leak test a thermoplastic piping system, including brittle piping, with low pressure air, while being capable of re-pressurizing the system to compensate for pressure variations therein due to leaks and/or other external factors.

6 Claims, 5 Drawing Sheets

(56) References Cited

U.S. PATENT DOCUMENTS

| | | | | |
|---|---|---|---|---|
| 3,756,072 A * | 9/1973 | MacMurray | G01M 3/3209 | 73/40.5 R |
| 3,903,729 A * | 9/1975 | Covington | F17D 5/06 | 73/40.5 R |
| 4,091,657 A * | 5/1978 | Jackson | G01M 3/002 | 73/40 |
| 4,109,513 A * | 8/1978 | Schott | G01M 3/26 | 73/49.1 |
| 4,211,107 A * | 7/1980 | Sleeter | G01M 3/2846 | 73/49.6 |
| 4,497,290 A * | 2/1985 | Harris | F02M 1/16 | 123/179.11 |
| 4,534,208 A * | 8/1985 | Macin | G01M 3/10 | 455/226.1 |
| 4,901,558 A * | 2/1990 | Leining | G01M 3/363 | 73/45.4 |
| 4,979,390 A * | 12/1990 | Schupack | G01M 3/04 | 73/38 |
| 4,998,434 A * | 3/1991 | Asbra | G01M 3/02 | 73/40.5 R |
| 5,067,343 A * | 11/1991 | Sullivan | G01N 15/082 | 73/40.7 |
| 5,072,622 A * | 12/1991 | Roach | G01M 3/283 | 73/40.5 R |
| 5,201,213 A * | 4/1993 | Henning | G01M 3/3236 | 73/40 |
| 5,214,412 A * | 5/1993 | Gavlak | G01M 3/20 | 324/455 |
| 5,287,730 A * | 2/1994 | Condon | G01M 3/022 | 138/94.3 |
| 5,445,026 A * | 8/1995 | Eagan | G01H 3/12 | 73/40.5 A |
| 5,548,993 A * | 8/1996 | Alexander | G01M 3/2815 | 73/40.5 R |
| 5,705,737 A * | 1/1998 | Liao | G01M 3/025 | 73/40 |
| 5,710,377 A * | 1/1998 | Youngquist | G01H 3/00 | 73/40.5 A |
| 5,850,037 A * | 12/1998 | Mullins | G01M 3/2815 | 73/40.5 R |
| 5,854,422 A * | 12/1998 | McKeon | G01H 3/12 | 73/49.2 |
| 5,898,105 A * | 4/1999 | Owens | G01M 3/2846 | 73/40 |
| 5,948,969 A * | 9/1999 | Fierro | G01M 3/2892 | 73/40.5 R |
| 5,955,670 A * | 9/1999 | Goodman | F16C 33/6625 | 340/605 |
| 5,979,239 A * | 11/1999 | Youngquist | G01H 9/002 | 73/40.5 A |
| 6,058,076 A * | 5/2000 | Komninos | G01H 1/00 | 367/135 |
| 6,209,560 B1 * | 4/2001 | Shaw | F16K 1/307 | 137/14 |
| 6,220,098 B1 * | 4/2001 | Johnson | G01H 1/00 | 73/40.5 A |
| 6,234,021 B1 * | 5/2001 | Piety | G01H 1/00 | 73/592 |
| 6,247,353 B1 * | 6/2001 | Battenberg | G01H 1/003 | 73/40.5 A |
| 6,318,155 B1 * | 11/2001 | Carr | F01P 11/18 | 73/49.7 |
| 6,651,486 B1 * | 11/2003 | Johnson | G01M 3/2815 | 73/40 |
| 6,826,957 B2 * | 12/2004 | Martone | G01M 3/3236 | 73/40.5 R |
| 6,912,890 B2 * | 7/2005 | Brewer | F17D 5/02 | 73/40 |
| 7,051,577 B2 * | 5/2006 | Komninos | G01M 3/24 | 73/40.5 A |
| 7,075,653 B1 * | 7/2006 | Rutherford | G01F 23/14 | 250/338.5 |
| 7,281,411 B2 * | 10/2007 | Brewer | F17D 5/02 | 73/49.1 |
| 7,540,183 B2 * | 6/2009 | Komninos | G01M 3/24 | 73/23.2 |
| 7,624,624 B2 * | 12/2009 | Meskouri | F02M 25/0818 | 73/40.5 R |
| 8,151,628 B1 * | 4/2012 | Smida | G01M 3/26 | 73/37 |
| 8,468,874 B2 * | 6/2013 | Komninos | G01J 5/0859 | 73/40 |
| 8,495,914 B2 * | 7/2013 | Izikoff | G01M 3/243 | 73/601 |
| 8,584,511 B2 * | 11/2013 | Smida | G01M 3/26 | 73/37 |
| 9,091,613 B2 * | 7/2015 | Baliga | G01M 3/243 | |
| 9,223,299 B2 * | 12/2015 | Jenkins | G06F 16/632 | |
| 9,316,560 B2 * | 4/2016 | Smida | G01M 3/26 | |
| 9,341,603 B1 * | 5/2016 | Jenkins | G01M 3/24 | |
| 9,476,794 B2 * | 10/2016 | Pavlik | G01M 3/26 | |
| 10,288,519 B2 * | 5/2019 | De La Cruz | G01M 3/2815 | |
| 2002/0121128 A1* | 9/2002 | Van Dyke | G01M 3/20 | 73/40 |
| 2002/0134140 A1* | 9/2002 | Baumoel | G01F 1/66 | 73/40.5 A |
| 2003/0159495 A1* | 8/2003 | Cardinale | G01N 1/24 | 73/23.2 |
| 2003/0167826 A1* | 9/2003 | Holt | G01M 3/26 | 73/40 |
| 2003/0167847 A1* | 9/2003 | Brown | G01M 3/243 | 73/592 |
| 2005/0126264 A1* | 6/2005 | Komninos | G01M 3/24 | 73/40.5 A |
| 2006/0033075 A1* | 2/2006 | Harris | C09K 3/12 | 252/72 |
| 2009/0303058 A1* | 12/2009 | Goodman | G01N 29/46 | 340/605 |
| 2012/0024045 A1* | 2/2012 | Herzog | G01M 3/3236 | 73/49.2 |
| 2012/0103069 A1* | 5/2012 | Al-Qahtani | G01M 3/243 | 73/40.5 A |
| 2013/0008233 A1* | 1/2013 | Kosugi | A61B 1/00059 | 73/40.5 R |
| 2014/0251831 A1* | 9/2014 | Ley | G01M 3/226 | 205/780.5 |
| 2017/0307463 A1* | 10/2017 | Valles | F01M 1/20 | |
| 2018/0275007 A1* | 9/2018 | Jones | G01M 3/3209 | |
| 2018/0320827 A1* | 11/2018 | Hull | G01M 3/2815 | |
| 2019/0145846 A1* | 5/2019 | Valles | F01M 1/20 | 73/114.57 |

FOREIGN PATENT DOCUMENTS

| | | |
|---|---|---|
| DE | 102009018271 | 4/2010 |
| DE | 102010027999 | 10/2011 |
| EP | 1069411 A1 | 1/2001 |
| EP | 0991888 B1 | 9/2003 |
| EP | 1371962 A1 | 12/2003 |
| EP | 2028471 A2 | 2/2009 |
| EP | 2581723 A2 | 4/2013 |
| EP | 3015838 A1 | 5/2016 |
| EP | 3206002 A1 | 8/2017 |
| EP | 2483656 B1 | 11/2017 |
| GB | 2346974 A | 8/2000 |
| WO | WO2000052442 | 9/2000 |
| WO | WO 2018056956 A1 | 3/2018 |

* cited by examiner

LEAK TEST SYSTEM AND METHOD FOR THERMOPLASTIC PIPING

FIELD OF THE INVENTION

The present invention relates generally to the leak testing piping systems and more particularly to leak testing electrofusion joined piping using low pressure air.

BACKGROUND OF THE INVENTION

Leak testing is a staple process employed onto piping systems, including installed systems, to ensure there are no cracks, holes, bad seals, or other openings present, that can result in a respective fluid to leak from the corresponding piping system. Presence of leaks can lead to potential safety concerns, as well as translate into economic losses due to loss of inventory and potential infrastructure damage.

Common leak testing methods include introducing a compressed fluid into a piping system, either utilizing a pump to provide elevated pressures, or in the case of drain, waste and vent (DWV) systems, fill the pipes to a certain elevation above the pipes with a fluid. The piping system will have all of its openings blanked (sealed), wherein the pressure difference between inside and outside the pipe will cause the compressed fluid to escape the piping through any cracks, holes, bad seals, and so on. The compressed fluid can be liquid or gas. One way of detecting leaks using liquid include visually noting liquid bubbling or passing through such openings. Compressed gases can include a type of tracer gas, such as Helium, wherein the environment surrounding the piping is then analyzed (using a gas analyzer) to detect the presence of the tracer gas (thereby indicating a leak).

Another example of compressed gas can be air, wherein an ultrasonic analyzer is used to detect for sounds made by air escaping through such openings in the piping system. Alternatively, a soap solution can be applied to the joints of the piping system, wherein escaping air at any leaks or openings will create visible soap bubbles, thereby indicating the presence and location of such leaks. However, such approaches typically require injecting the gas at high pressure. As such, the use of compressed gases for leak testing brittle piping, such as thermoplastic piping, can be a safety concern considering that if the piping were to rupture, stored energy could be released rapidly and potentially cause injury to nearby personnel. Moreover, a ruptured pipe, even if not creating a safety hazard, would require new piping to replace the damaged equipment.

Conversely, using lower pressured air for leak testing such thermoplastic piping may also present problems in maintaining sufficient pressure differential for air to escape, since thermoplastic piping is susceptible to expansion, thereby causing the pressure to reduce within (unrelated to the presence of leaks). Temperature fluctuations can also reduce or increase the pressure. Moreover, pressure limiting devices used to limit the pressure of the air can fail, which can result in an overpressure to the piping system and potentially cause a catastrophic failure as previously described. Examples of pressure limiting devices that may fail include pressure sensors, valves, and relief valves. Additionally, an ultrasonic analyzer may have difficulties in detecting low-pressure air escaping once the pressure within the piping falls below the limits of the detectors ability to identify escaping air, particularly since the analyzer may be used to identify both the presence and location of leaks. Thus, unless the system is constantly re-pressurized, this may potentially result in a missed leak(s), since the ultrasonic analyzer has to be maneuvered about the entire piping system searching for the low audible sound of low-pressure air escaping prior to the user ascertaining the presence of a leak.

As such, thermoplastic piping, particularly piping that employ electrofusion welded joints, typically use liquids such as water to leak test such piping. Examples of piping that use electrofusion welded joints can include drainage piping. However, if leaks are discovered through such water-injected leak tests, it becomes very difficult to get all the water out of the piping, specifically the socket joints, wherein it is particularly problematic to re-fuse a joint if there is any residual water in the fitting. Similarly, the use of a soap solution that is sprayed onto to the piping to help locate leaks on a piping system also result in the introduction of liquids into the electrofusion joints, thereby potentially rendering the joint non-repairable due to the presence of liquids.

It should, therefore, be appreciated there remains a need for a leak test system that addresses these concerns. The present invention fulfills these needs and others.

SUMMARY OF THE INVENTION

Briefly and in general terms, the present invention provides a system and method for leak testing a thermoplastic piping system. The leak test system includes a pump assembly having an air pump configured to pressurize a piping system with air. The pump assembly further includes a pressure sensor, pressure switch, pressure controller, and solenoid valve for maintaining the pressure within the piping system to a prescribed pressure. The pump, by design, cannot produce a pressure that exceeds the piping system design limitations. As such, the leak test system can safely leak test a thermoplastic piping system, including brittle piping, with low pressure air while being capable of re-pressurizing the piping system to compensate for pressure variations therein.

More specifically, by example and not limitation, the pressure controller is configured to maintain the pressure within the piping system at a prescribed level, e.g., 5 psig, by using relay switches to turn the air pump on/off and open/close the solenoid valve, in coordination with input signals via the pressure switch that is mounted to the pressure sensor. The air pump is designed to be intrinsically safe having a maximum pressure output of not more than 15 psig, thereby providing no risk of overpressure to the piping system if the pressure sensor, switch, and/or controller is to fail. The inherently safe design may be in addition to any other pressure limiting devices installed on the leak test system, e.g., relief valves.

In a detailed embodiment, the leak test system can identify the presence or absence of leaks in a piping system by monitoring the pressure therein after pressurization. Decreasing pressure indicates the likely presence of one or more leaks within the piping system. The leak test system can further include an ultrasonic leak detection device to identify the location of leaks on a piping system, after detecting the presence of such leaks using the pump assembly.

In another detailed embodiment, the air pump can be configured to operate as a vacuum pump by reversing the inlet and outlet ports. As such, a partial vacuum is created within the piping system, and the presence of leaks can be identified by monitoring if the partial vacuum holds or if the pressure rises. The leak detection system using a vacuum pump can have the same control and operating procedure as when using an air pump, including a controller and pressure sensor, and configured to maintain a prescribed set point, e.g., −5 psig.

In yet another detailed embodiment, the pressure controller and/or pressure switch can be bypassed, enabling the air pump to run continuously so as to safely maintain the piping system pressurized, thereby aiding the ultrasonic leak detection device in locating such leaks based on the sound of the air escaping therefrom. Similarly, the pressure controller and/or pressure switch can be bypassed to enable the vacuum pump to run continuously.

In yet another detailed embodiment, the leak test system includes tubing, e.g., flexible hose or piping, to connect the air pump assembly to the piping system. The tubing can be secured to an outlet or cleanout opening on the piping system using a test plug. Test plugs can also be used to blank, or seal, an opening, when conducting the leak test. Different test plugs having different sizes can be used, depending on the size of the opening on the piping system.

In yet another detailed embodiment, the pump assembly can be placed within a self-contained structure, wherein such structure includes a connection point for tubing to connect the air pump assembly to the piping system. The structure can further include a display for a pressure gauge that can be configured to illuminate upon the detection of pressure decreasing in a piping system.

In yet another detailed embodiment, the leak testing system can be stored in a portable container that is configured to hold the self-contained structure, the ultrasonic leak detection device with corresponding noise cancellation headphones, and tubing, e.g., flexible hose.

For purposes of summarizing the invention and the advantages achieved over the prior art, certain advantages of the invention have been described herein. It is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention disclosed herein. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings.

DETAILED DESCRIPTION OF THE PREFERRED EMBODIMENTS

Figure 1:
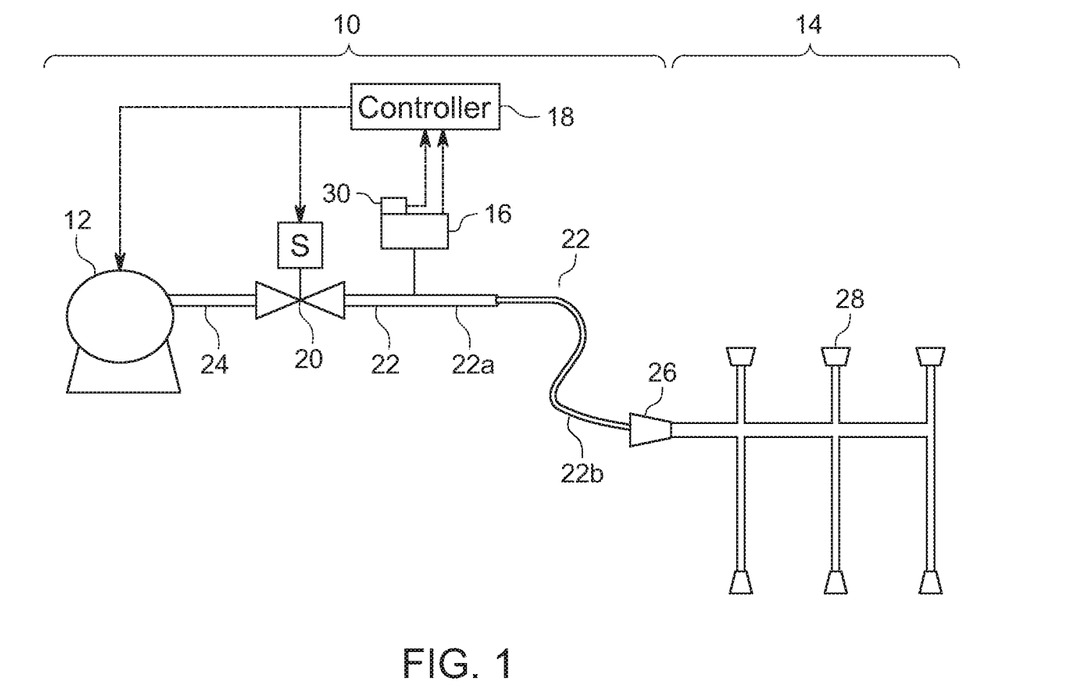
FIG. 1 is a schematic of a leak test system in accordance with the present invention, depicting an air pump assembly connected to a piping system via a flexible hose.

Referring now to the drawings, and in particular FIG. 1, there is shown a system and method for leak testing a thermoplastic piping system. The leak test system 10 includes a pump assembly having an air pump 12 configured to pressurize a piping system 14 with air, wherein the air pump 12 is configured by design not to output pressure exceeding the piping system design limitations. The pump assembly further includes a pressure sensor 16, pressure controller 18, pressure switch 30, and solenoid valve 20 for maintaining the pressure within the piping system 14 to a prescribed pressure. The leak test system 10 can include tubing 22 for connecting the air pump assembly to the piping system 14, and further include an ultrasonic leak detection device (not shown) to locate potential leaks identified on the piping system 14. As such, the leak test system 10 can safely leak test a thermoplastic piping system 14, including brittle piping, with low pressure air, while being capable of re-pressurizing the system to compensate for pressure variations therein due to leaks and/or other external factors.

Figure 2:
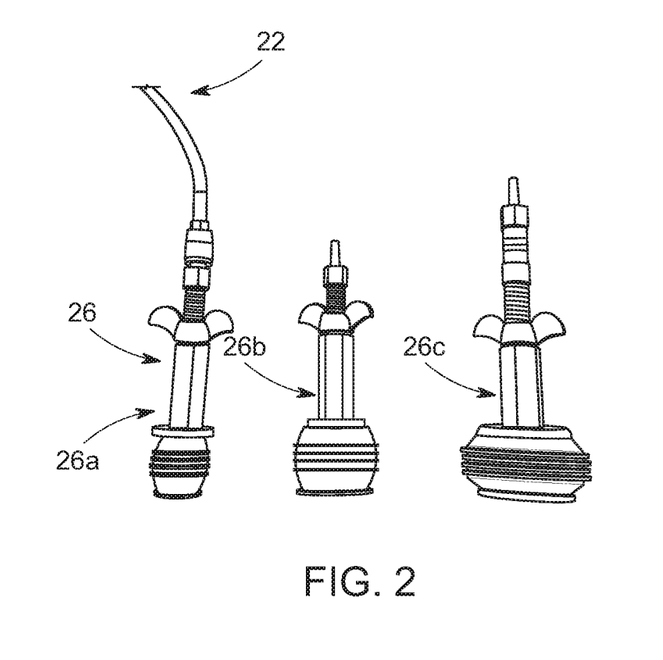
FIG. 2 is a depiction of various sizes of test plugs that are a part of a leak test system in accordance with the present invention.

With reference now to FIGS. 1 and 2, the air pump 12 can draw surrounding air through an inlet port and discharge the air via an outlet port. Additionally, the air pump can be configured as a vacuum pump by reversing the air pump inlet and outlet ports, thereby drawing residual air and gas from within the piping system to create a partial vacuum therein (further described below). The air pump assembly can be configured with an outlet 24 that connects the outlet port (or nozzle) of the air pump 12 to the solenoid valve 20. The outlet can be embodied in any configuration enabling air flow therethrough, such as piping, tubing, a nozzle, and so on. A tubing 22 can connect the solenoid valve 20 to a piping system 14, wherein the tubing 22 can house a pressure sensor 16, a pressure switch 30, and/or a pressure controller 18.

In an exemplary embodiment, the tubing 22 can comprise two sections removably connected to each other. A first section 22a of the tubing, connected to the solenoid valve 20, can house the pressure sensor 16, pressure switch 30, and/or a pressure controller 18. The second section 22b of the tubing, can be connected to the piping system 14. The removable connection between the two sections can be any means that provides a pressure tight seal. Each section (22a, 22b) can be embodied in any configuration enabling air flow therethrough, such as piping, flexible hose, and so on. For example, the second section 22b can include a flexible hose that connects to the piping system 14 using a test plug 26, which is secured within/about an open outlet or cleanout opening (an access point for cleaning/unplugging) on the piping system. The test plug 26 can be secured to the flexible hose and piping system 14 via a screwed connection. Moreover, the test plug 26 can be secured to the piping system by being inserted within either a pipe fitting, such as a socket or cleanout fitting, or pipe ID or flange, wherein when the test plug is expanded, creates a pressure tight seal with the piping system that can withstand the pressure created by the air pump. The test plug 26 configured for the leak test system can vary in size, so as to accommodate different available opening sizes found on a given piping system. Examples of test plug sizes can include 2" (26a), 3" (26b), 4" (26c) pipe sizes, or any size to match a corresponding pipe size. Alternatively, a hard pipe connection such as a flange, can be used to connect the second section 22b with the piping system 14. In addition or alternatively, the first section 22a can directly connect to the piping system 14, via a test plug.

The piping system can comprise any type of material, including brittle thermoplastic piping such as PVC, CPVC, PP, and PVDF among others. More specifically, the leak test system 10 is particularly useful for piping that employ electrofusion welded joints, such as Fuseal® piping, PPro Seal™ piping, and some double containment systems, e.g., Fuseal Squared®.

With continued reference to FIG. 1, prior to connecting an air pump 12 to a piping system 14, all open ends in the piping system 14 must blanked, i.e. isolated or closed-off using test plugs 28 or valves, so as to ensure that air cannot otherwise escape the piping system 14. The test plugs 28 can be secured to the piping system similar to how the test plug 26 is secured to the piping system. Moreover, test plugs 26 and test plugs 28 may be the same type, wherein an integral center fitting enables for air to flow through test plugs 26. Smaller sections of a large piping system may be tested separately so as to easier locate any potential defects, provided such smaller sections can be isolated from the other sections of the piping system.

Activating an air pump 12 connected to a piping system 14 will introduce air into said piping system, causing the pressure therein to rise. As aforementioned, the air pump assembly can include a pressure sensor 16, pressure switch 30, controller 18, and solenoid valve 20 that limit and control the pressure rise within the piping system 14. Although other valve types can be used, such as a butterfly valve or gate valve, a solenoid valve is preferred due to its fast response time, particularly since it needs to open and close with pump actuation/shutdown. Specifically, the valve 20 can enable or restrict air flow from the pump 12 and outlet 24 to the piping system 14. The pressure sensor 16 is disposed downstream of the solenoid valve 20 and configured to detect the pressure within the tubing 22, which is reflective of the pressure within the piping system 14. Moreover, the pressure controller 18 can include a pressure gauge (not shown), thereby providing visual indication of the pressure within the piping system 14, as detected by the pressure sensor 16. Alternatively, a separate pressure gauge can be included on the tubing 22, providing visual indication of the pressure within the piping system.

Figure 4:
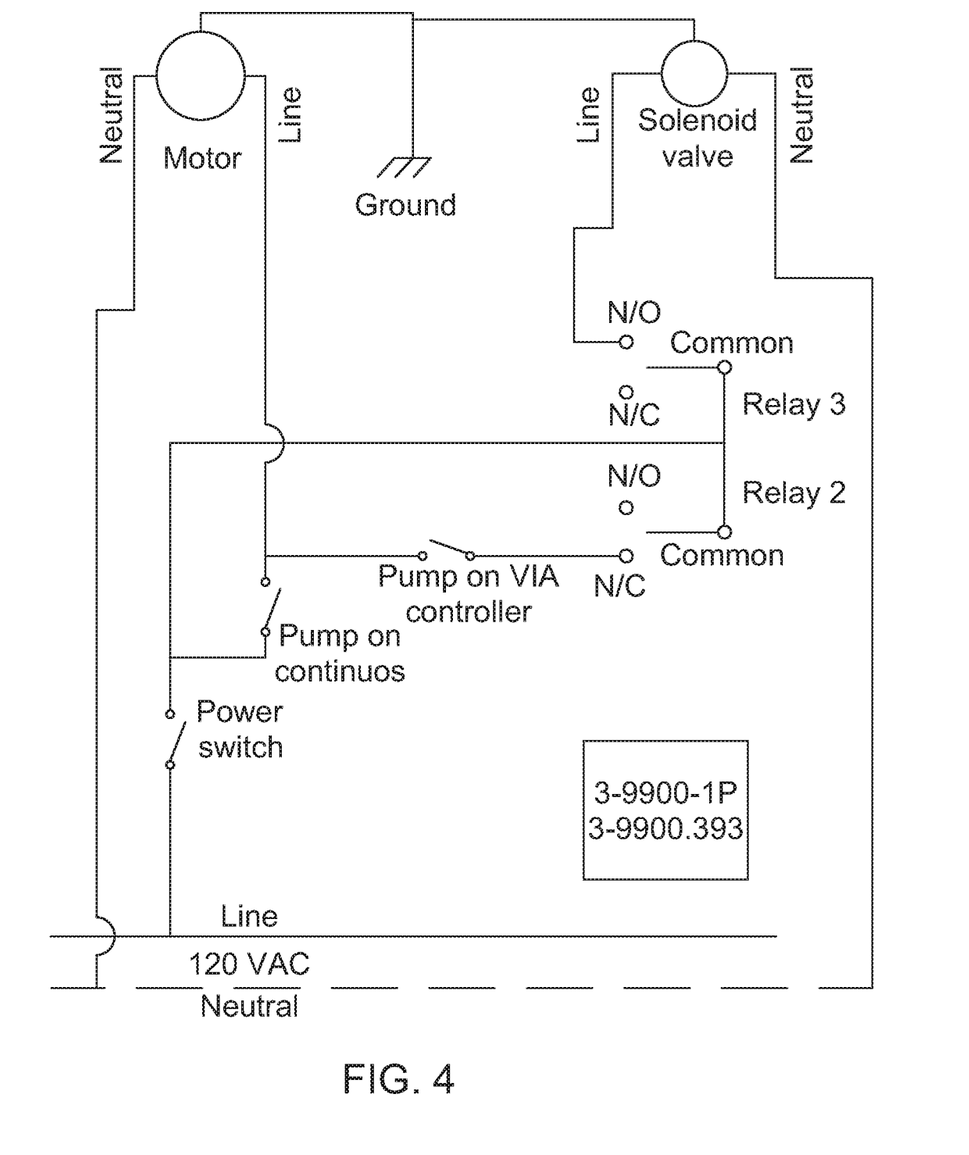
FIG. 4 is an electrical circuit depiction of the air pump assembly in FIG. 1, depicting the configuration of the electrical circuit connected to the air pump motor and solenoid valve.

Referring now to FIGS. 1 and 4, the controller 18 can be electrically coupled to the pressure sensor 16, and further be electrically coupled to the air pump 12 and the solenoid valve 20 via relay switches (not shown on FIG. 1) configured on the controller 18. As such, the controller 18, based on the detected pressure from the pressure sensor 16, can be configured to control the air pump 12 operation and solenoid valve 20 positioning. Specifically, the controller 18 can start/stop the air pump 12, and/or open/close the solenoid valve 20, so as to maintain a prescribed pressure within the piping system 14. More specifically, a pressure switch 30 mounted to the pressure sensor 16 can be activated upon the prescribed pressure being measured by the pressure sensor 16, such that the controller 18 receives a signal to shut down the pump 12 and/or close the solenoid valve 20 (via the relay switches). Conversely, the controller 18 and pressure switch 30 can be bypassed to enable continuous pump operation (further described below).

The prescribed pressure for leak testing can vary by piping system. For example, the plastic piping industry has adopted a 5 psig limit for all brittle materials, which has been determined to be a safe pressure for detecting leaks, and high enough for locating leaks when spraying soapy water onto a piping system.

In an exemplary embodiment, the controller 18 and pressure switch 30 can be set to maintain a prescribed pressure, e.g., 5 psig, within the tubing 22 and piping system 14. As aforementioned, once the pressure sensor 16 detects a pressure of 5 psig within the piping system 14, the pressure switch 30 is activated, sending a signal to the controller 18 to shut-off the air pump 12 and/or close the solenoid valve 20, via relay switches configured on the controller 18. The piping system 14 is thus completely isolated, enabling the pressure therein to be displayed and monitored on the controller 18 via the pressure sensor 16 since it is disposed downstream of the solenoid valve 20. The length of time for a pump assembly to pressurize a piping system can vary, depending on the pump output, and volume within the piping system. In an exemplary embodiment, the air pump 12 can be configured with an output of 5 CFM, which would take about 5 minutes to pressurize 300 ft of 6" piping to 5 psig.

In the event that the pressure sensor 16, switch 30, and/or controller 18 fail to correctly operate, resulting in a failure to stop the air pump 12 and close the solenoid valve 20 after the pressure has reached the respective setpoint (prescribed pressure), there is no risk of overpressure to the piping system since the air pump 12 by design is limited in the maximum pressure that can be outputted into a piping system. This inherently safe design may be in addition to any other pressure limiting device(s) disposed on the system, e.g., a relief valve, which may be susceptible to failure. The maximum output pressure of the pump can take into account the piping system 14 design limitations, such that there is no risk of overpressure to the piping system. For example, the maximum design pressure for piping systems can be 50 psig or more depending on size and material. In an exemplary embodiment, the air pump 12 can be designed to not be able to produce more than 15 psig, i.e. the maximum output pressure of the pump is 15 psig. As such, the air pump 12 cannot generate sufficient energy to cause a pipe failure for such piping systems.

The controller 18, using the pressure switch 30, can also restart the air pump 12 and/or open the solenoid valve 20 to increase the pressure within the piping system 14. For example, during the initial pressurization by the air pump assembly, the piping system 14, particularly those made of thermoplastic material, may undergo piping expansion, and/or experience temperature fluctuations, such that the pressure within the piping system may decrease below the controller pressure setpoint (prescribed pressure). As such, upon the pressure sensor 16 detecting the pressure in the system falling below the prescribed pressure, the pressure switch 30 will be deactivated, enabling the controller 18, via the relay switches, to restart the air pump 12 and/or open the solenoid valve 20, and thereby re-pressurizing the system up to the prescribed pressure (controller pressure setpoint).

As such, the pressure controller 18 is configured to maintain a prescribed pressure within the piping system 14. In an exemplary embodiment, the on/off pressure band for the controller 18 can be +/−1.5 psi, such that the pressure within the system can be stabilized between 3.5 psi and 6.5 psi. An example of a pressure sensor 16 and controller 18 used by the air pump assembly is the Signet 2450 pressure sensor and Signet 9900 controller.

A piping system typically requires a minimum time to have lapsed after first reaching a controller pressure set point in order to achieve pressure stabilization. Such minimum time can vary, e.g., one to five minutes. Thus, pressure variations occurring after such minimum time has lapsed is deemed to be due to reasons other than pressure stabilization. Once the pressure in the piping system stabilizes, the pressure within the piping system 14 can be monitored for a prescribed time, e.g, several minutes, via a pressure gauge, that can be located on the controller 18 and thereby electrically coupled to the pressure sensor 16. If the pressure holds, i.e. does not decrease, then the piping system 14 is leak free. Conversely, a decrease in pressure, resulting in the pump to be cycled, i.e. turn on and off as the system loses pressure and re-pressurizes, indicates the likely presence of one or more leaks in the piping system 14. Frequent pump cycling may indicate a large sized leak, while pump cycling occurring over several minutes may indicate a small leak.

Figure 3:
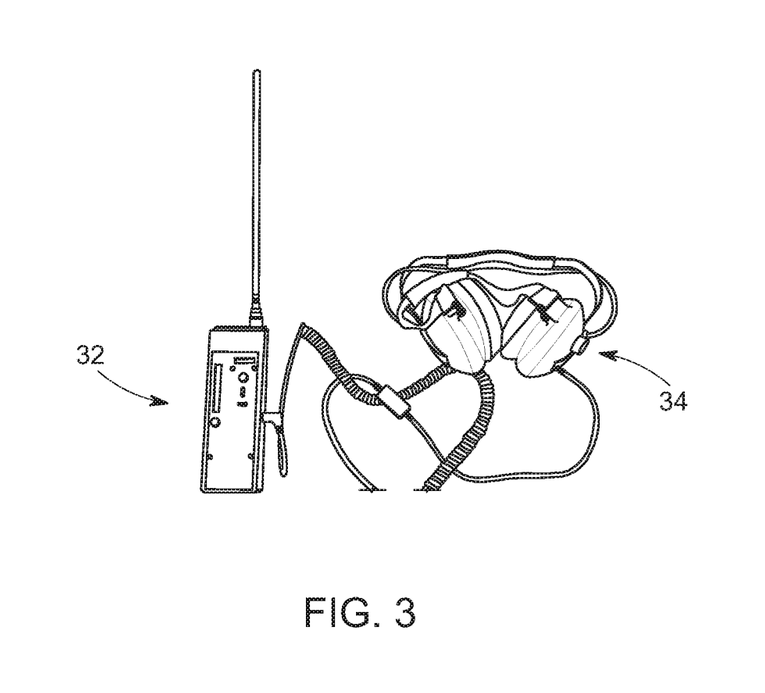
FIG. 3 is a depiction of an ultrasonic leak detection device with noise cancelling headphones, as part of a leak test system in accordance with the present invention.

Referring now to FIGS. 1 and 3, the leak detection system 10 can further include an ultrasonic leak detection device 32 for locating leaks present on a piping system, by detecting the sound of air escaping through such leaks. Thus, the ultrasonic leak detection device (ULDD) 32 can be used by the leak detection system 10 upon the air pump assembly identifying the presence of leaks in the piping system 14. The ULDD 32 can detect air escaping from small bore holes, such as air escaping at 5 psig from a hole as small as 0.005". As aforementioned, the air pump assembly, using the controller 18, can be used to maintain the pressure within the piping system at 5 psig, to aid the ULDD 32 in detecting the sound of air escaping. Alternatively, a bypass switch can be included with the air pump assembly to enable the air pump 12 to bypass the controller 18 and/or pressure switch 30, and thereby run continuously. As such, the air pump 12 can then provide a continuous pressure to the piping system 14, making it easier for a ULDD 32 to detect the sound of the air escaping. Moreover, having the air pump 12 run continuously avoids it from having to continuously cycle between on and off, which could potentially damage the air pump motor. For example, a large sized leak may result in the pump to continuously cycle on and off every few seconds. The ULDD 32 can also be embodied as a handheld detection device with noise cancelling headphones 34, thereby enabling a user to move the ULDD 32 along the piping system 14 in locating a leak(s).

Once the leak(s) have been identified, such piping can be repaired while still dry. Thus, the risk of exposing leaks on the piping system to water due to any subsequent hydrostatic pressure tests performed is eliminated. As aforementioned, the leak detection system seeks to minimize the exposure of leak(s) to water, particularly for electrofusion welded joined piping, since it becomes very difficult to re-fuse a joint if there is any residual water in the fitting.

As aforementioned, the air pump can be also configured as a vacuum pump by reversing the inlet and outlet ports of the pump, i.e. connecting the outlet 24 to the pump inlet port, thereby enabling the pump to draw residual air and gas from within the piping system. A partial vacuum will subsequently be created within the piping system, wherein the controller 18 and pressure switch 30 can have a setpoint of −5 psig, to maintain said partial vacuum. As such, the leak detection system will identify leaks based on determining whether the partial vacuum holds, or whether the pressure increases. The vacuum pump is similarly limited to creating a half vacuum, or −7.5 psig, for which the piping system is designed to withstand, in the event the pressure sensor, pressure switch and/or controller fail to maintain a prescribed partial vacuum. In addition to or alternatively, an additional valve may be included enabling the inlet and outlet ports to be reversed.

The leak detection system using a vacuum pump will have similar control and operating procedures as previously described with the air pump configuration. For example, the controller 18 will be configured to start/stop the vacuum pump and/or open/close the solenoid valve, using the pressure switch 30, so as to maintain the prescribed partial vacuum setpoint, e.g., −5 psig. In this configuration, the pressure sensor will be upstream of the solenoid valve and still be reflective of the pressure within the piping system. The piping system may also be subject to a period of stabilization, e.g., one to five minutes, due to piping constriction and temperature fluctuations. After stabilization, the pressure is monitored for a prescribed time to determine if the partial vacuum holds. The continual rise in pressure within the piping system indicates the likely presence of leaks therein, wherein an ultrasonic leak detection device can be used to locate such leaks by detecting air seeping into the piping system.

Figure 5:
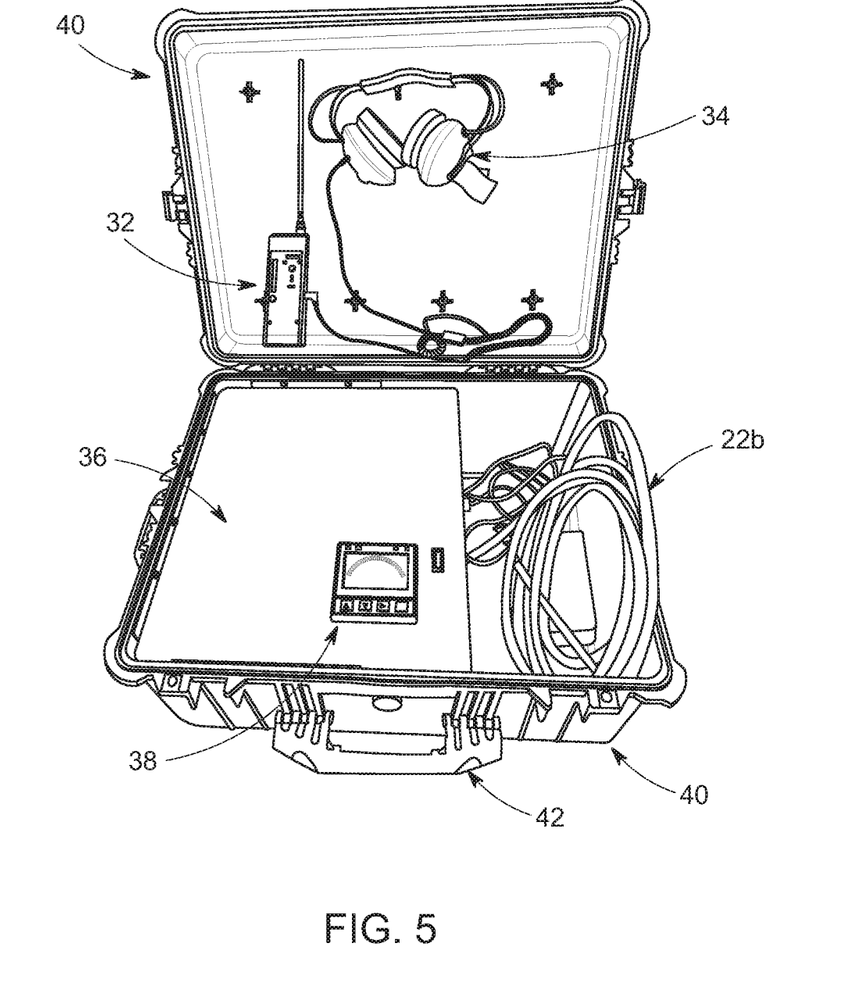
FIG. 5 is a depiction of a leak test system stored in a custom container, depicting the air pump assembly disposed within a self-contained structure, and placed alongside the ultrasonic leak detection device, noise cancelling headphones, and flexible hose.

Referring now to FIGS. 1 & 5, the air pump assembly can be housed within a self-contained structure 36, enclosing the air pump 12, outlet 24, pressure sensor 16, controller 18, and solenoid valve 20. The structure 36 can also enclose the first section 22a of the tubing 22. Moreover, the structure 36 provides a display 38 for a digital pressure gauge, thereby visually indicating the pressure detected by the pressure sensor 16. The display 38 can be configured to illuminate when detecting a pressure drop in the piping system 14 (or increase in pressure, when using a vacuum pump). The structure 36 includes a connection nozzle enabling the second section 22b of the tubing 22 to connect to the first section 22a. Moreover, the structure 36 includes, externally, a power switch for the air pump assembly, a switch to turn the air pump on, and a switch that enables the controller and pressure switch to be bypassed, thereby allowing for continuous pump operation and air supply. The structure 36 can be stored and secured within a container 40, which also includes space to store tubing 22, e.g., the second section 22b of the tubing 22, an Ultrasonic Lead Detection Device 32, and corresponding noise cancelling headphones 34. Handles 42 can be included with the container 40, thereby providing a compact leak detection system 10 that is portable.

Figure 6:
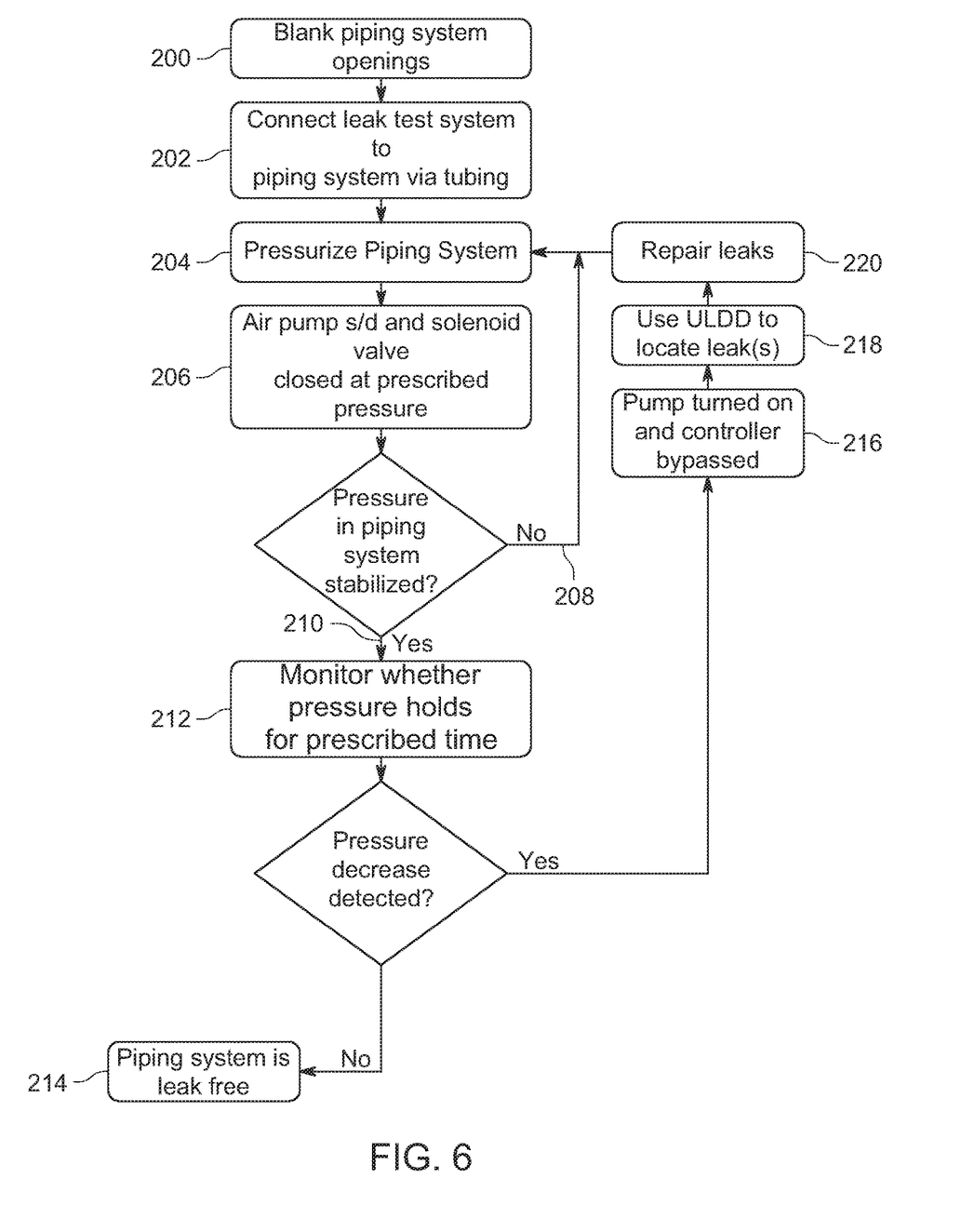
FIG. 6 is a flow chart of a method in accordance with the present invention, depicting the operation of a leak test assembly connected to a piping system.

Referring now to FIG. 6, an exemplary flow chart depicting the method for leak testing a brittle piping system with air is shown. First, all the openings of a piping system are sealed, or blanked 200. Next, a leak test system is connected 202 to the piping system via tubing. The air pump is subsequently turned on, wherein the piping system is pressurized 204 with air. The pressure switch and controller will then turn off (206) the air pump and close the solenoid valve once a prescribed pressure (e.g., 5 psig) is reached. The controller will subsequently cycle (208) the air pump on/off, and the valve open/close, until the pressure within the piping system stabilizes (210). Subsequently, the pressure within the piping system is monitored (212), for a prescribed time and using a pressure gauge, to determine if it holds. If the pressure within the piping system holds (214), then the piping system is leak free. If the pressure decreases, the air pump is turned on (216) and the solenoid valve is opened, while the controller is bypassed, enabling for continuous operation of the pump. Subsequently, an Ultrasonic Leak Detection Device is used (218) to locate leaks on the piping system. Any leaks located are repaired (220), wherein the piping system is again leak tested to ensure no leaks remain.

It should be appreciated from the foregoing that the present invention provides a system and method for leak testing a thermoplastic piping system. The leak test system includes a pump assembly having an air pump configured to pressurize a piping system with air, wherein the air pump is configured by design not to output pressure exceeding the piping system design limitations. The pump assembly further includes a pressure sensor, pressure controller, pressure switch, and solenoid valve for maintaining the pressure within the piping system to a prescribed pressure. The leak test system can include tubing for connecting the pump assembly to the piping system, and further include an ultrasonic leak detection device to locate potential leaks identified on the piping system. As such, the leak test system can safely leak test a thermoplastic piping system, including brittle piping, with low pressure air, while being capable of re-pressurizing the system to compensate for pressure variations therein due to leaks and/or other external factors.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

Although the invention has been disclosed in detail with reference only to the exemplary embodiments, those skilled in the art will appreciate that various other embodiments can be provided without departing from the scope of the invention, to include any and all combination of features discussed herein.

What is claimed is:

1. A method for leak testing a thermoplastic piping system, comprising:
   isolating a piping system;
   connecting a leak detection system to the piping system, the leak detection system comprising:
      an air pump connected to an outlet, the air pump configured with a maximum pressure output of not more than 15 psig,
      a valve coupled to the outlet for enabling and restricting air flow from the outlet;
      a tubing coupling the valve to the thermoplastic piping system, to introduce air within said piping system;
      a pressure sensor coupled to the tubing to measure the pressure therein and within the piping system, the pressure sensor disposed downstream of the valve,
      a pressure switch mounted to the pressure sensor and configured to be activated based on a prescribed pressure measured by the pressure sensor,
      a pressure controller electrically coupled to the pressure sensor and pressure switch, the pressure controller having one or more relay switches electrically coupled to the air pump and valve, such that the pressure controller is configured to automatically maintain a prescribed pressure within the piping system, to account for pressure variations therein, and
      a pressure gauge electrically coupled to the pressure sensor, to visually indicate the measured pressure;
   activating the air pump to pressurize the piping system;
   stabilizing the piping system to a prescribed pressure using the controller to control air pump operation and valve positioning;
   monitoring the pressure within the piping system for a prescribed time via the pressure gauge;
   restarting the air pump upon determining the pressure cannot hold in the piping system, the controller bypassed to allow for continuous pump operation;
   locating leaks on the piping system using an ultrasonic leak detection device.

2. The method as defined in claim 1, further comprising: repairing identified leaks; and
re-testing the piping system with the leak detection system.

3. The method as defined in claim 1, wherein the prescribed pressure is between 3.5 psig and 6.5 psig.

4. The method as defined in claim 1, wherein the leak detection system further comprises a bypass switch to bypass the controller, enabling the air pump to continuously run and pressurize the piping system.

5. The method as defined in claim 1, wherein the leak detection system further comprises a self-contained structure housing the vacuum pump, the inlet, a first section of the tubing coupled to the pressure sensor, the pressure switch, the pressure gauge, the valve, and the pressure controller, the self-contained structure including a digital display for the pressure gauge.

6. The method as defined in claim 1, wherein the leak detection system further comprises a portable container configured to house the self-contained structure, a second section of the tubing, and an ultrasonic leak detection device with corresponding noise cancelling headphones.

* * * * *